US010637674B2

United States Patent
Asher et al.

(10) Patent No.: US 10,637,674 B2
(45) Date of Patent: Apr. 28, 2020

(54) SYSTEM AND METHOD FOR REAL-TIME DECODING AND MONITORING FOR ENCRYPTED INSTANT MESSAGING AND OTHER INFORMATION EXCHANGE APPLICATIONS

(71) Applicant: TG-17, LLC, Boston, MA (US)

(72) Inventors: Ron Asher, Tel-Aviv (IL); Yaacob Aizer, Ganei Tikva (IL)

(73) Assignee: TG-17, Inc., Boston, MA (US)

(*) Notice: Subject to any disclaimer, the term of this patent is extended or adjusted under 35 U.S.C. 154(b) by 190 days.

(21) Appl. No.: 16/002,820

(22) Filed: Jun. 7, 2018

(65) Prior Publication Data

US 2018/0359107 A1 Dec. 13, 2018

Related U.S. Application Data

(60) Provisional application No. 62/516,407, filed on Jun. 7, 2017.

(51) Int. Cl.
| | |
|---|---|
| *G06K 9/62* | (2006.01) |
| *G06K 9/32* | (2006.01) |
| *H04L 12/18* | (2006.01) |
| *G06N 3/08* | (2006.01) |
| *G06T 3/00* | (2006.01) |
| *G06F 40/103* | (2020.01) |

(52) U.S. Cl.
CPC ........ *H04L 12/1831* (2013.01); *G06F 40/103* (2020.01); *G06K 9/3266* (2013.01); *G06K 9/6261* (2013.01); *G06N 3/08* (2013.01); *G06T 3/0068* (2013.01); *G06K 2209/01* (2013.01); *G06K 2209/03* (2013.01)

(58) Field of Classification Search
None
See application file for complete search history.

(56) References Cited

U.S. PATENT DOCUMENTS

| | | | |
|---|---|---|---|
| 9,411,547 B1 * | 8/2016 | Bessinger | G06F 40/174 |
| 9,760,778 B1 * | 9/2017 | Wakim | G06F 16/51 |
| 10,417,516 B2 * | 9/2019 | Reinpoldt, III | G06K 9/344 |

(Continued)

OTHER PUBLICATIONS

Ben Kus, Box: Bringing image recognition and OCR to cloud content management, Google Cloud (Year: 2017).*

*Primary Examiner* — Randolph I Chu
(74) *Attorney, Agent, or Firm* — Polsinelli, PC

(57) ABSTRACT

First and second screenshot images are obtained from a monitoring application provided on a first computing device. Each screenshot image comprises a plurality of content portions displayed by a communication application on the first computing device, and content boxing is performed to calculate a plurality of content boxes for the plurality of content portions. Each content box is classified as containing textual communication content or image communication content. Textual communications are extracted via Optical Character Recognition (OCR) and object identifiers are extracted from the image communications via image recognition. At least one shared content box present in both the first and second screenshot images is identified and used to temporally align the extracted textual communications. The temporally aligned textual communications are condensed into a textual communication sequence.

40 Claims, 10 Drawing Sheets

(56) References Cited

U.S. PATENT DOCUMENTS

| | | | |
|---|---|---|---|
| 2011/0081948 A1* | 4/2011 | Shirai | H04M 1/27475 455/556.2 |
| 2015/0347578 A1* | 12/2015 | Tsai | G06Q 30/02 715/205 |
| 2016/0019431 A1* | 1/2016 | Wang | G06K 9/2054 382/182 |
| 2016/0078291 A1* | 3/2016 | Kim | G06F 3/04883 382/164 |
| 2016/0188181 A1* | 6/2016 | Smith | G06F 3/045 715/765 |
| 2016/0188541 A1* | 6/2016 | Chulinin | G06K 9/6814 704/8 |
| 2016/0267323 A1* | 9/2016 | Chulinin | G06K 9/00463 |
| 2019/0065882 A1* | 2/2019 | Reinpoldt, III | G06K 9/00449 |

* cited by examiner

Output of Screenshot Capture
Received at Content Analysis

Output of Content Analysis
Received at Content Classification

SYSTEM AND METHOD FOR REAL-TIME DECODING AND MONITORING FOR ENCRYPTED INSTANT MESSAGING AND OTHER INFORMATION EXCHANGE APPLICATIONS

CROSS-REFERENCE TO RELATED APPLICATIONS

This application claims the benefit of priority to U.S. Provisional Application No. 62/516,407 filed Jun. 7, 2017 and entitled "SYSTEM AND METHOD FOR REAL-TIME DECODING AND MONITORING FOR ENCRYPTED INSTANT MESSAGING AND OTHER INFORMATION EXCHANGE APPLICATIONS", the disclosure of which is herein incorporated by reference in its entirety.

TECHNICAL FIELD

The present disclosure pertains to monitoring systems and devices, and more specifically to systems and methods for providing automated content extraction and compilation from encrypted or access-restricted sources.

BACKGROUND

As various communication networks, platforms, and applications have proliferated, so too have security concerns regarding their use. In response, various forms of content encryption have found increased use in protecting and securing the content of various user communications. This content is most commonly text-based, but can also be multi-media in nature and may comprise other file formats and other file types. In some instances, different encryption schemes might be employed depending on the type of content being transmitted, or the particular communication network, platform, applications, and/or user device(s) employed in the content transmission. For example, encryption can be symmetric or asymmetric, client-server or end-to-end, using one or more encryption schemes known in the art.

While useful from a privacy standpoint, such encryption presents challenges when it is also desired to monitor, log, or otherwise evaluate user communications that are encrypted, as these two purposes are often viewed as incompatible, e.g. end-to-end encryption is intended to ensure that only an intended recipient of an encrypted transmission can decipher or otherwise extract and view the transmitted content of the encrypted transmission. As such, it would be desirable to provide systems and methods capable of real-time decoding, monitoring, or analysis of real-time encrypted communications without breaking the encryption scheme.

SUMMARY OF THE INVENTION

Disclosed are systems and methods for performing content monitoring of content, such as communication content, retrieved from at least one application provided on a user computing device. In some embodiments, the method comprises obtaining, from a monitoring application provided on a first computing device, first and second screenshot images each comprising a plurality of content portions displayed by a communication application on the first computing device, performing content boxing on the first and second screenshot images to calculate a plurality of content boxes, each content box containing a given one of the plurality of content portions, classifying each content box as containing textual communication content or image communication content; performing, for each content box classified as containing textual communication content, Optical Character Recognition (OCR) to extract the textual communication and for each content box classified as containing image communication content, performing image recognition to extract object identifiers; identifying at least one shared content box present in both the first and second screenshot images and, based on the at least one shared content box, temporally aligning textual communications extracted from the first screenshot image with textual communications extracted from the second screenshot image; and condensing the temporally aligned textual communications to generate a condensed textual communication sequence.

In some embodiments, the classifying of each content box as containing textual communication content or image communication content is based on one or more of a color composition of the content box; and a relative position of the content box within the first or second screenshot image and an expected screenshot layout associated with the communication application.

In some embodiments, the method further comprises: temporally aligning content boxes classified as containing image communication content with the condensed textual communication sequence; and inserting the temporally aligned content boxes to generate a composite reconstructed communication sequence.

In some embodiments, condensing the temporally aligned textual communications comprises removing redundant temporally aligned textual communications.

In some embodiments, the method further comprises capturing a user input to the communication application on the first computing device by using a key logger, the key logger configured to associate each captured user input with a timestamp at which the captured user input was received.

In some embodiments, the method further comprises searching the captured user inputs obtained by the key logger for one or more of the extracted textual communications; and in response to locating a given extracted textual communication within a captured user input obtained by the key logger, generating a temporal reference point by associating the given extracted textual communication with the timestamp of the matching captured user input.

In some embodiments, the method further comprises temporally aligning a plurality of extracted textual communications by calculating each extracted textual communication's relative position with respect to one or more generated temporal reference points.

In some embodiments, obtaining first and second screenshot images comprises: detecting, from the first computing device, an indication that the communication application is running in the foreground of the first computing device and a user of the first computing device has provided one or more user inputs; capturing at least the first and second screenshot images, such that the first and second screenshot images are captured at separate times; and based on the one or more inputs provided by the user of the first computing device, capturing at least a third screenshot image different from the first and second screenshot images.

In some embodiments, the one or more user inputs comprise a keyboard input, an account login input, a swipe input, a gesture input, or a scrolling input.

In some embodiments, the method further comprises generating a trigger signal for screenshot image capture in response to determining that the user input to the communication application comprises an actuation of an enter or send user interface element.

In some embodiments, one or more of the first and second screenshot images are obtained in response to: determining that the communication application has been commanded to run in the foreground of the computing device; or determining that the communication application has been commanded to stop running in the foreground of the computing device.

In some embodiments, content boxing comprises calculating at least two opposing pixel coordinates within the first or second screenshot image data, such that the two opposing pixel coordinates define the content box containing a content portion.

In some embodiments, a first listing of a plurality of opposing pixel coordinates are saved in a metadata of the first screenshot image and a second listing of a plurality of opposing pixel coordinates are saved in a metadata of the second screenshot image.

In some embodiments, content boxing comprises applying one or more of an image thresholding algorithm, morphological image transforms, and contour detection algorithms in order to thereby calculate the content box to provide a tight bounding of the content portion.

In some embodiments, the image thresholding algorithm is Otsu's algorithm.

In some embodiments, classifying each content box comprises applying a neural network to generate a classification tag, where the neural network is trained on training data generated from previously analyzed screenshot images and content boxes.

In some embodiments, image recognition comprises a facial recognition algorithm or a machine learning algorithm trained to identify the communication application associated with one or more of the plurality of content portions.

In some embodiments, content boxing comprises applying OCR to identify one or more text paragraphs and generating one or more coarse content boxes based on the OCR-identified text paragraphs.

In some embodiments, the method further comprises at least one of: downscaling one or more of the first and second screenshot images prior to performing content boxing; and converting one or more of the first and second screenshot images to grayscale prior to performing content boxing.

In some embodiments, the image recognition performed on content boxes classified as containing image data extracts a facial profile or individual identity, and wherein the extracted facial profile or individual identity is used to generate processing priority rules for the screenshot image associated with the content box containing the extracted facial profile or individual identity.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
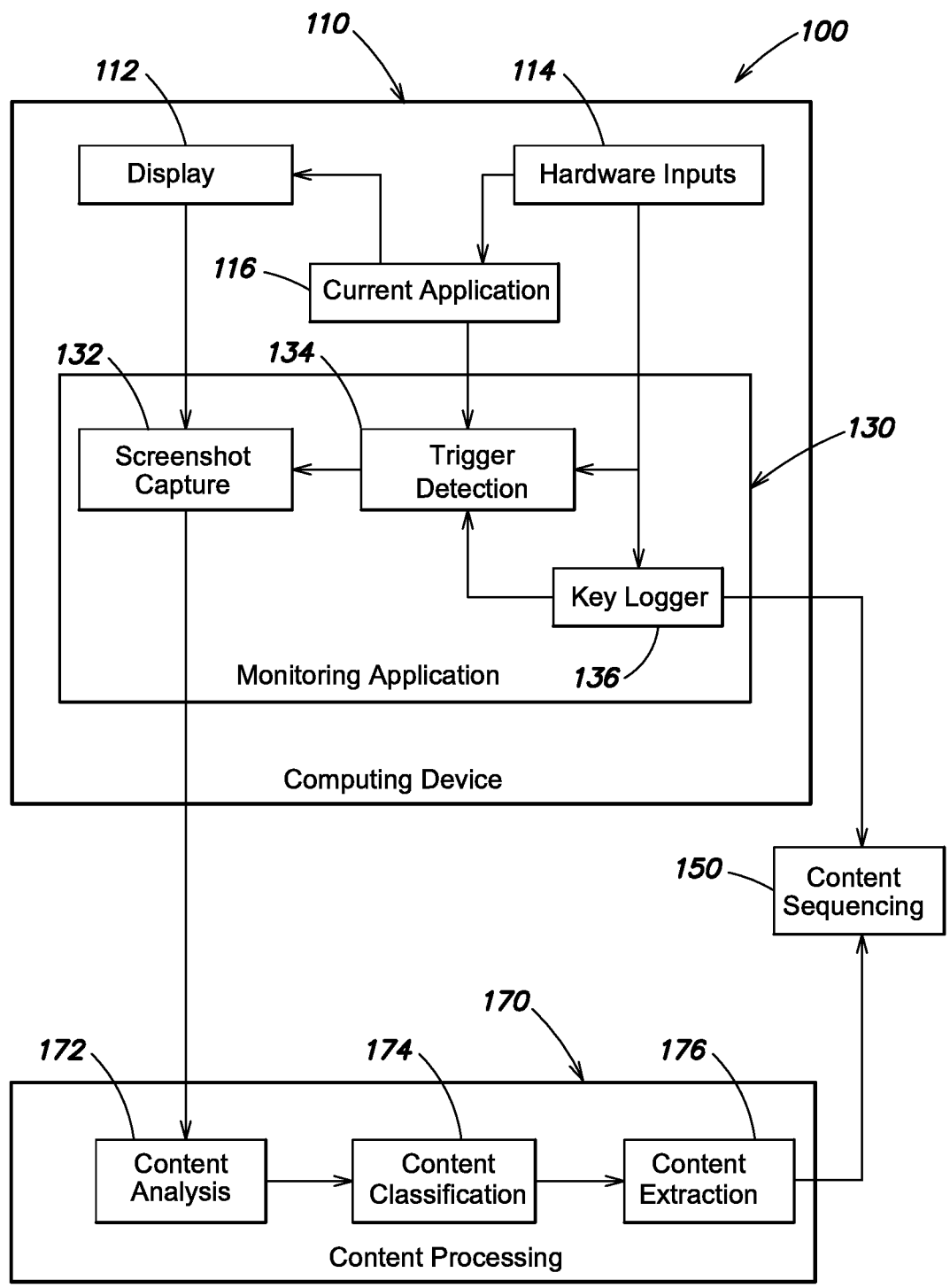
FIG. 1 depicts an exemplary architecture diagram of a content monitoring system of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

The disclosed systems and methods for real-time content decoding and monitoring can be employed in various contexts and scenarios, one example of which is providing online threat monitoring and detection services to the communications of an individual being monitored (alternately referred to herein as a 'Subject'), even when these communications are encrypted or otherwise access-restricted. Generally speaking, the rise of the Internet has greatly increased the ease with which a victim can come in contact with a threat or a threatening individual, and accordingly, it would be highly desirable to monitor Internet or mobile-device based communications for such threats—where children were previously only subject to potential bullying in person, children may now be subject to cyber-bullying or other forms of online harassment any time that they go online and/or communicate with others via a mobile computing device.

Even with increased awareness, scrutiny, and attempts to find a solution, the problem of these digital threats remains unsolved. The first issue is detecting or otherwise identifying a threat in the first place—no technologies presently exist that are capable of reliably and comprehensively identifying digital threats. Further still, many digital threats are currently unmonitored, and not necessarily associated with any given entity. For example, cyber-bullying (of children in particular) is a pervasive digital threat that has thus far proven highly difficult to monitor and prevent. Responsibility has largely fallen on the shoulders of the parents of children being bullied, and these parents quickly discover that the resources available to them are inadequate. Some tools are available that allow parents to actively police the behavior of their children (e.g. internet access restrictions on routers, child mode on computing devices, etc.), but these tools require active monitoring and intervention on the part of the parent in order to be effective. Additionally, the access required to detect a digital threat is often at odds with privacy concerns, as individuals are reluctant to provide access to their mobile computing device(s), to their personal online communications and activities, and/or these communications and online activities are by design encrypted and unable to be monitored with conventional solutions.

Accordingly, the disclosed systems and methods for real-time content decoding and monitoring of encrypted or access-restricted communications can be best understood in the context in which they are employed. FIG. 1 depicts an example architecture of a content monitoring system 100 in which aspects of the present disclosure may operate. Bolded solid line boxes indicate constituent components of the system 100 while non-bolded solid line boxes indicate sub-components of system 100, and arrows indicate communicative couplings between various components and sub-components.

Broadly, content monitoring system 100 comprises a computing device 110, a monitoring application 130 running on computing device 110, and a content processing system 170. In general, computing device 110 is associated with a user ('Subject') to be monitored, or is otherwise a computing device that is transmitting and/or receiving communications that are to be decoded and monitored. Examples of such computing devices include, but are not limited to, mobile computing devices, cell phones, tablet devices, laptop computers, wearable devices, smart watches, and various other electronic devices capable of wired or wireless electronic communication of data, as will be appreciated by those of ordinary skill in the art. In some embodiments, a Subject (or the individual requesting monitoring of the Subject, alternatively referred to herein as a ('Guardian') may be associated with two or more paired computing devices, such as a smartphone and a smart watch that is paired with or otherwise communicatively coupled to the smartphone. For the purposes of the present disclosure, such combinations of paired computing devices are included under the label of 'computing device'.

Regardless of the precise nature of the computing device 110, it is contemplated that computing device 110 comprises at least a display 112, one or more hardware inputs 114, and a current application 116 (e.g. the application being executed by a processor of computing device 110 and provided on display 112 for user interaction or user input, where the application can be a third-party application or a system application). The nature of current application 116 can depend on the type of computing device 110 being used, e.g. a mobile phone will run mobile applications while a desktop computer will run full-fledged applications, etc. In some embodiments, computing device 110 might simultaneously display two or more applications on display 112, e.g. in a split-screen mode. In such embodiments, both applications might be considered to comprise current application 116, and input data can be obtained or collected accordingly. Alternatively, only the application that is currently receiving input or is currently selected to receive input may be flagged as the current application 116. In general, it is contemplated that current application 116, and various other applications installed on computing device 110 which might at other points in time become the active current application 116, together provide a valuable and rich source of input data for decoding and threat monitoring or other analysis, although this raw input data tends to be generally inaccessible in a cohesive or central manner, whether due to privacy and security concerns, compatibility issues, and/or collection issues.

Accordingly, monitoring application 130 is provided or installed upon computing device 110 in order to solve these problems and enable the efficient collection and analysis of the raw input data obtained from computing device 110 and/or current application 116. In some embodiments, monitoring application 130 can be installed within the standard security or permissions framework associated with computing device 110, i.e. the same as any other third-party app that the user might download and install on his or her computing device 110. However, in some cases, it may be necessary for monitoring application 130 to run with root or administrator privileges in order to bypass system or operating system restrictions and thereby ensure that monitoring application 130 has unencumbered access to all necessary aspects of computing device 110. Whether or not root privileges are provided, it is contemplated that monitoring application 130 can collect passive and/or active data from computing device 110, current application 116, and any sub-components or associated applications thereof.

Passive input data can generally be thought of as input data generated in the normal operation of computing device 110. For example, in the context of FIG. 1, monitoring application 130 includes a key logger 136 for capturing keystrokes or other user interface (UI) inputs to one or more of current application 116 and the computing device 110, where key logger 136 typically utilizes an application programming interface (API) or other back-end interface from one or more of current application 116 and computing device 110 in order to obtain suitable access for capturing the keystroke or UI input data of the user. In this manner, key logger 136 can be utilized to capture a user portion of any communication or conversation conducted via a current application 116 on mobile computing device 110, such as a typed email or a text message. Because key logger 136 operates in the confines of computing device 110 and in conjunction with its input mechanisms such as keyboards and GUI elements, key logger 136 can capture this user communication input data before it is encrypted and transmitted to its intended recipient. As mentioned previously, key logger 136 can capture other UI inputs besides just keystrokes. For example, these UI inputs could include the (x, y) coordinates of all touch or other navigational interactions between the user and the display 112 of computing device 110.

Active input data can generally be thought of as input data generated in response to a specific command generated or triggered by monitoring application 130. For example, in the context of FIG. 1, monitoring application 130 includes a screenshot capture system 132 for obtaining screenshots of content on display 112 and a trigger detection system 134 for generating a trigger command to activate screenshot capture system 132. Screenshot capture system 132 can be useful when monitoring application 130 does not have root/admin privileges or otherwise does not have sufficient permissions to access necessary user communication data (transmitted or received), as the screenshot functionality effectively permits monitoring application 130 to bypass this restriction by recognizing and extracting content directly from one or more screenshots captured by screenshot capture system 132. Additionally, whereas key logger 136 can capture only the user's participation in a conversation (e.g. the user's typed and transmitted messages), screenshot capture system 132 captures both a user's participation in a conversation and the participation of all other participants or users in the conversation (e.g. the user's received messages). In some embodiments, input data captured by key logger 136 can be used to supplement or corroborate input data captured by screenshot capture system 132, e.g. (x, y) input touch coordinates can be overlaid with a corresponding screenshot in order to determine the specific UI button or UI element that was actuated (if any) by the given (x, y) touch coordinate in question. However, because screenshot capture system 132 can capture all of the same input data that is obtained by key logger 136, in some embodiments monitoring application 130 may forego key logger 136 entirely and operate instead off of screenshot capture system 132.

Although only screenshot capture system 132 and key logger 136 are shown in FIG. 1, it is appreciated that various other systems and sub-components can be utilized by monitoring application 130 in order to capture one or more of passive data and active data indicative of user interactions or communications on the computing device 110. For example, a microphone recorder could be provided in order to record or otherwise obtain a duplicate copy of the sound that is measured by a microphone of the computing device 110 (e.g. a microphone that is one of the hardware input components 114). This microphone recording would be passive if the hardware microphone 114 of the computing device 110 was already in use, e.g. during a phone call or video chat), and would be active if the hardware microphone 114 must be activated directly by monitoring application 130 in order to capture the desired audio input data. As another example, a speaker recorder could be provided in order to record or otherwise obtain a duplicate copy of the sound that is emitted by a hardware speaker component of the computing device 110.

In addition to computing device 110 and monitoring application 130, which are generally co-located with one another (e.g. monitoring application 130 installed on computing device 110) and with the user being monitored (e.g. computing device 110 is being used or carried by the user being monitored), the content monitoring system 100 additionally comprises a content processing system 170. As illustrated in FIG. 1, content processing system 170 is distinct and remote from computing device 110 and monitoring application 130, although it is appreciated that in some embodiments, one or more of the functionalities and sub-components attributed to content processing system 170 and described below may instead be associated with one or more of computing device 110 and monitoring application 130.

As illustrated, content processing system 170 comprises a serial connection (or processing pipeline) comprising a content analysis system 172, a content classification system 174, and a content extraction system 176. The output of content extraction system 176 is fed into a content sequencing system 150, which is shown here as a separate and distinct component from both computing device 110 and content processing system 170, although in some embodiments content sequencing system 150 could be combined or otherwise integrally coupled with one of the two aforementioned architectural components of system 100. A more detailed description of the design and operation of processing pipeline of content processing system 170 will be provided below, and is best understood in the context of an operative example depicted in FIGS. 2-8.

Figure 4:
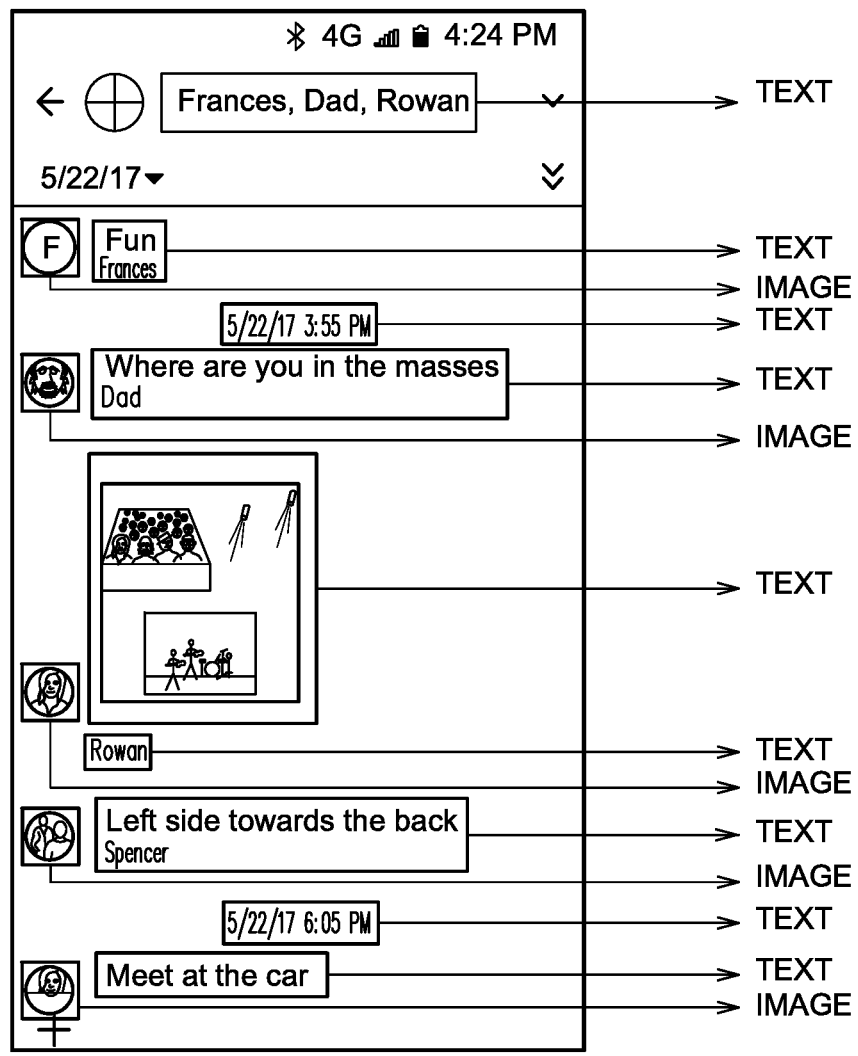
FIG. 4 depicts an exemplary content classified screenshot image according to an aspect of the present disclosure.
Figure 5:
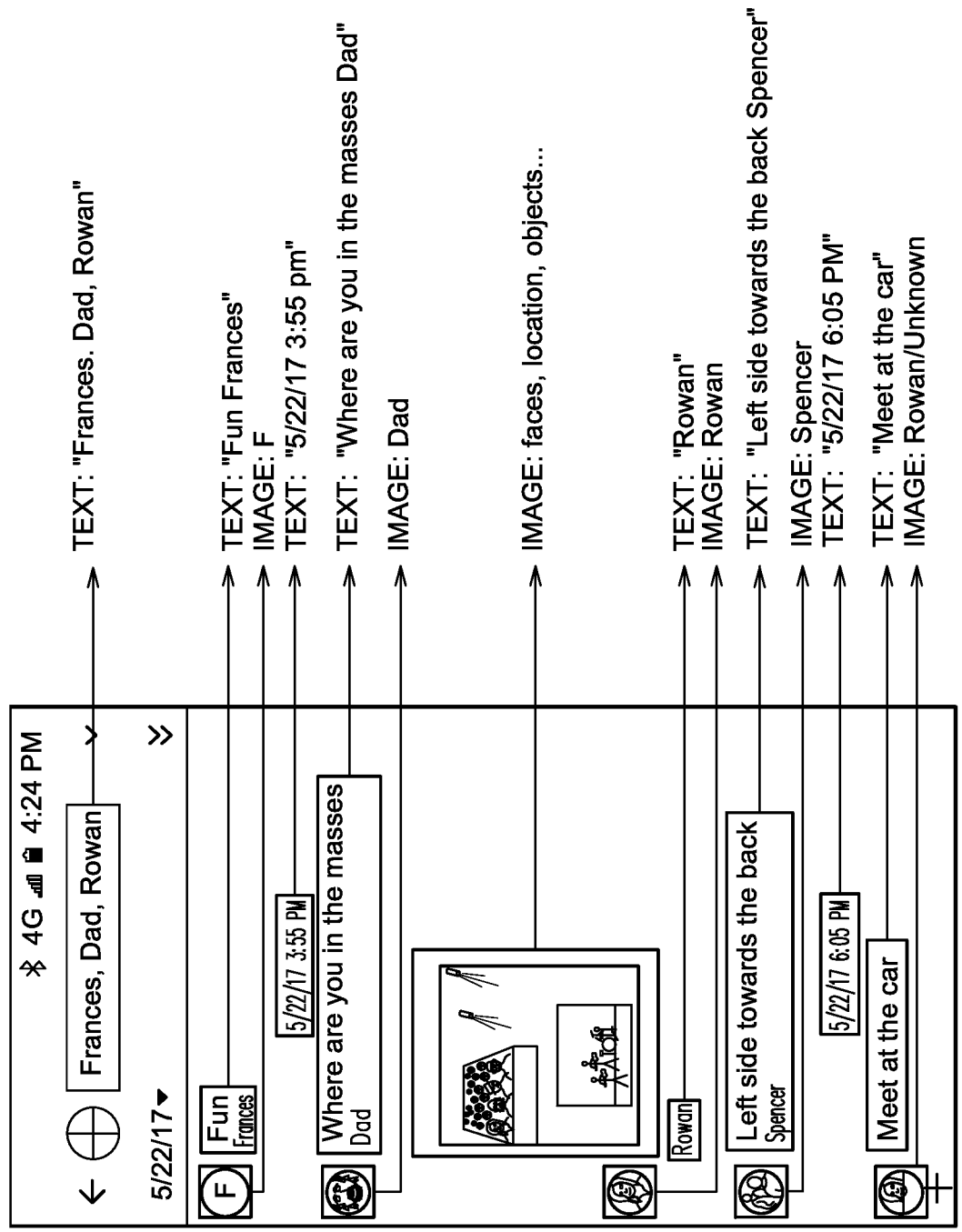
FIG. 5 depicts an exemplary content extracted screenshot image according to an aspect of the present disclosure.
Figure 6:
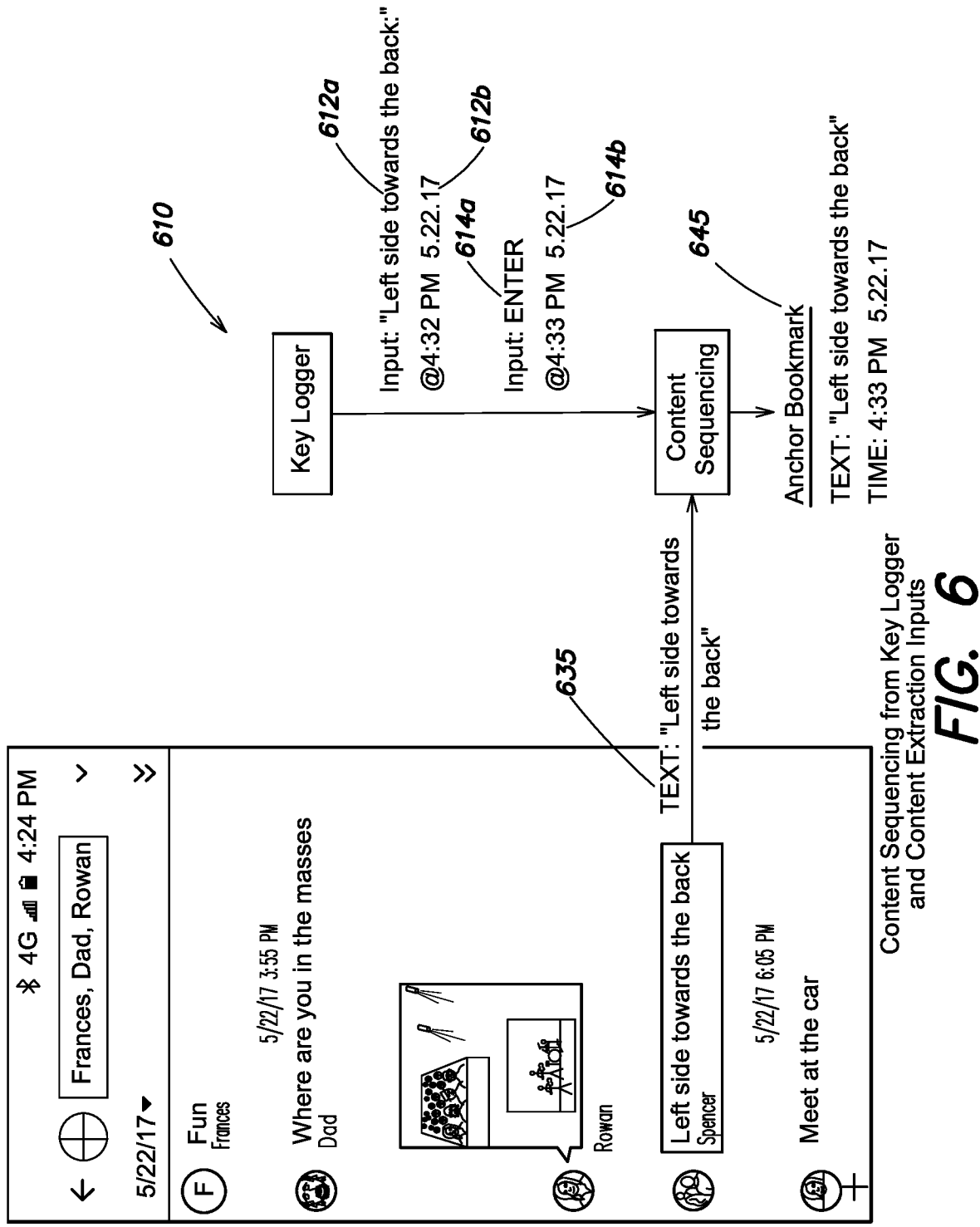
FIG. 6 depicts an exemplary screenshot image and an exemplary key logger-based content sequencing process according to an aspect of the present disclosure.
Figure 7:
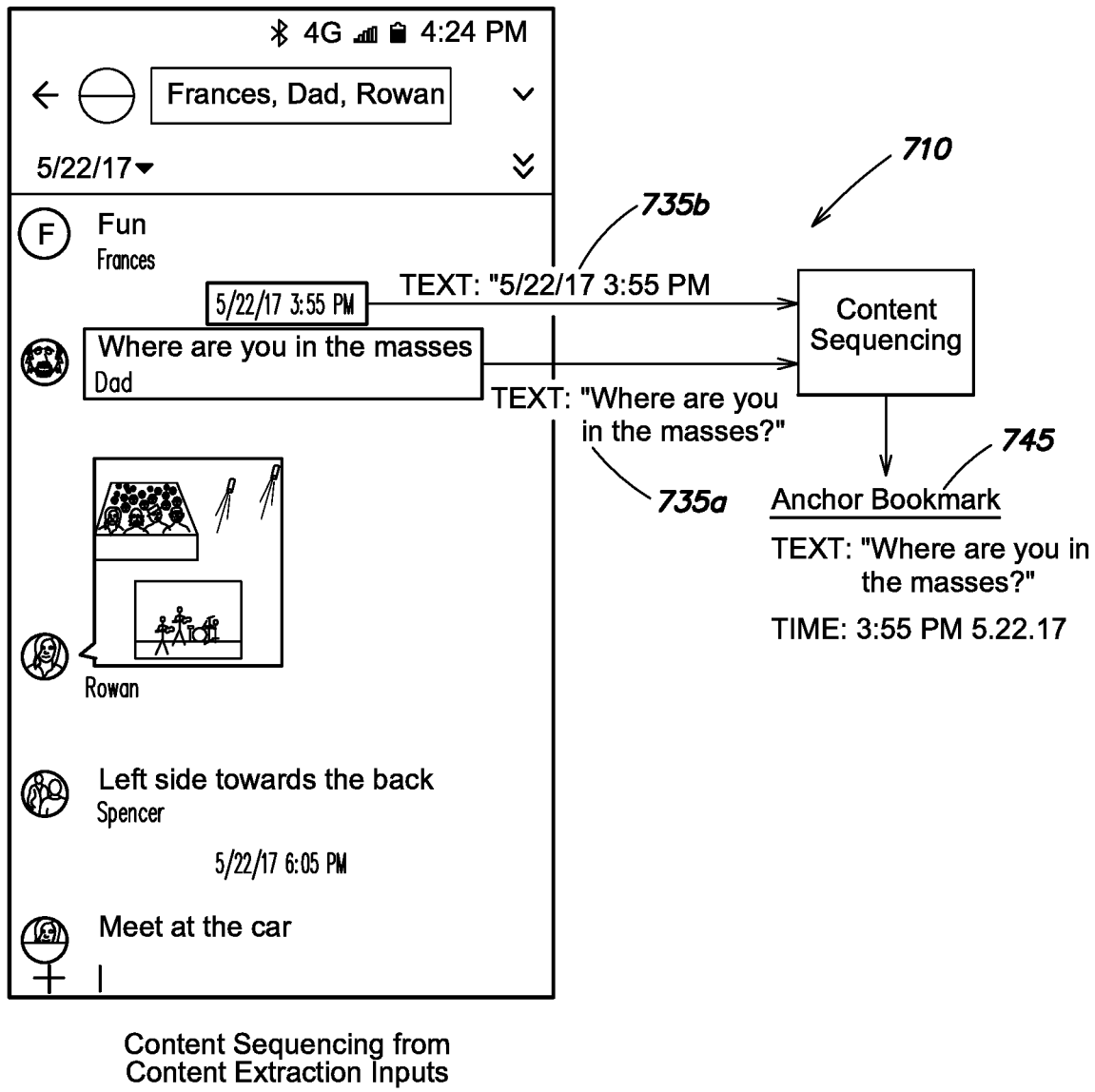
FIG. 7 depicts an exemplary screenshot image and an exemplary extracted content-based content sequencing process according to an aspect of the present disclosure.
Figure 8:
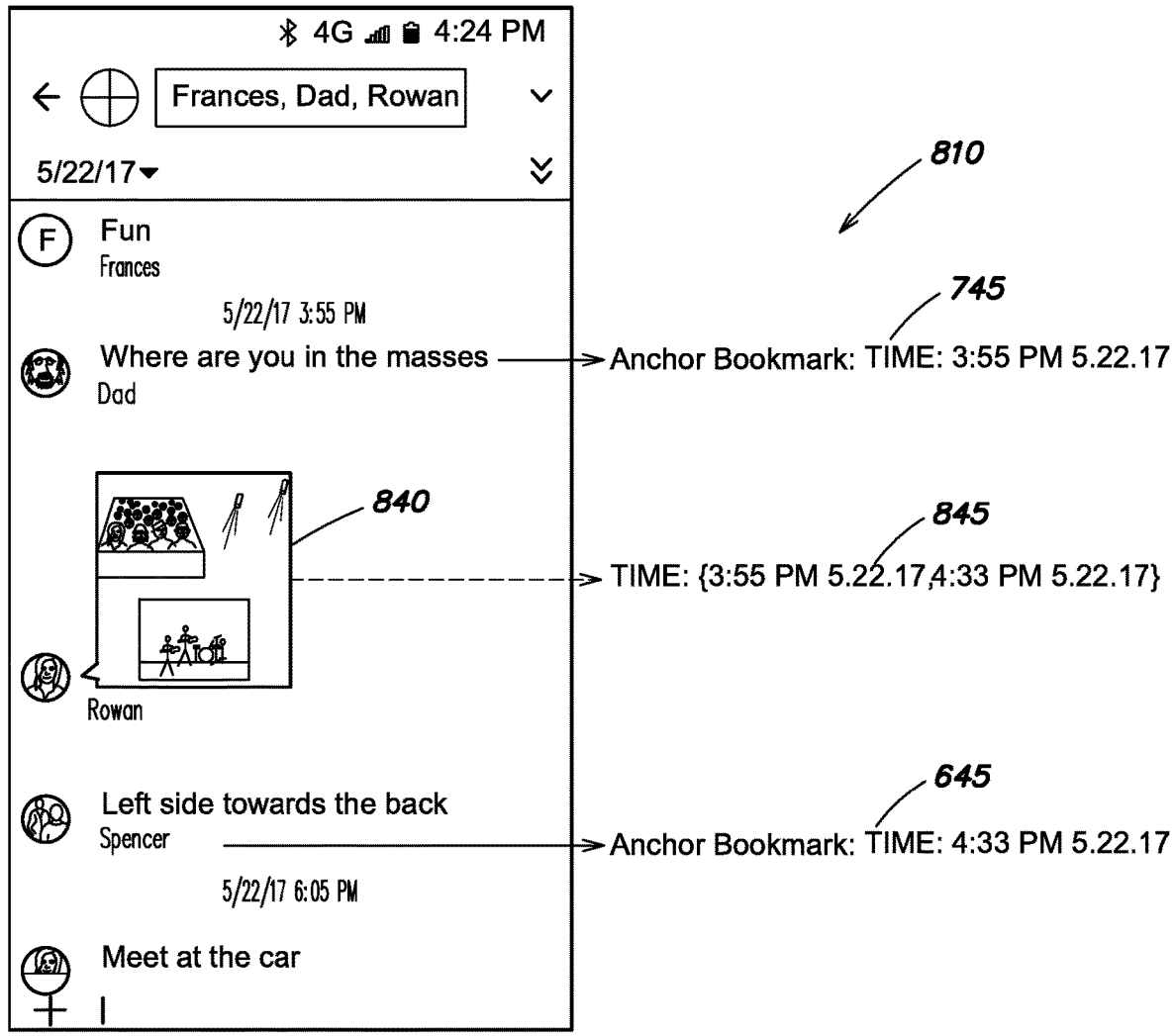
FIG. 8 depicts an exemplary screenshot image and an exemplary implicit content sequencing process according to an aspect of the present disclosure.

It is appreciated that the operative example of FIGS. 2-8 is provided for purposes of clarity and illustration, and is not intended to be construed as limiting with respect to the types of screenshots and certain screenshot analysis operations that can be performed by the content monitoring system 100 or other content monitoring systems according to aspects of the present disclosure. FIGS. 2-5 depict the processing pipeline/workflow beginning with screenshot capture at screenshot capture system 132 (see FIG. 2) and ending with content extraction at content extraction system 176 (see FIG. 5). FIGS. 6-8 depict various exemplary manners in which content sequencing can be performed by content sequencing system 150. In general, FIGS. 2-8 depict various scenarios of the screenshot processing pipeline. However, before this point can be reached, a screenshot must first be triggered and captured. Accordingly, the discussion below is presented in two parts: a first describes the process of capturing input screenshot data via monitoring application 130, and a second describes the processing pipeline for content analysis.

Screenshot Triggering and Capture

In a simple approach, screenshot capture system 132 could be configured to capture a screenshot at some pre-determined periodic interval, e.g. one screenshot per second. Such an approach could be further refined with the addition of various rules and capture parameters that would modify the capture rate of screenshot capture system 132, e.g. only capture screenshots at the periodic interval when a user input (e.g. touch) is being detected or was recently detected, or only capture screenshots at the periodic interval when computing device 110 is receiving data packets or recently received data packets, etc. However, no matter the specific rules implemented on top of a pre-determined periodic capture interval, screenshot capture system 132 will produce a large number of screenshot files which, being images, can require an undesirably large amount of storage space and/or data transmission bandwidth. Such concerns and limitations are especially prevalent when computing device 110 is a wireless mobile computing device such as a smartphone, which very commonly has both limited onboard storage capacity and limited wireless or cellular data bandwidth or availability.

The size of screenshot image files can vary with several factors, including the resolution of display 112 of computing device 110, the content being displayed in the screenshot, the compression algorithm(s) applied to the screenshot file, etc. However, screenshot image files are most typically on the order of several megabytes (MB) in size, and their storage and transmission can be particularly onerous when cellular data caps are often in the realm of 2-5 gigabytes (GB). Accordingly, in some embodiments it can be desirable to configure screenshot capture system 132 to avoid capturing largely redundant or overlapping screenshot image files while still capturing at least one screenshot corresponding to all portions of an ongoing conversation being conducted by a user of mobile computing device 110.

The aforementioned trigger detection system 134 can be used for precisely such a purpose, wherein trigger detection system 134 triggers screenshot capture system 132 to ensure a given conversation is fully monitored (i.e. no content or messages are missed because a screenshot failed to be captured at the appropriate moment) in substantially real-time (i.e. no significant delay between the time when the communication content is generated and the time when it is monitored). An example operative process of trigger detection system 134 is presented below, with specific reference to FIG. 2, which depicts a screenshot 200 of a raw output screenshot file captured by screenshot capture system 132 in response to a trigger from the trigger detection system 134.

Trigger detection system 134 must first obtain a potential trigger signal indicating that a user of computing device 110 might be initiating participating in a communication session or engaging in any other activity with computing device 110 that is subject to monitoring by content monitoring system 100. For example, trigger detection system 134 might constantly monitor the current application 116 that is being executed by computing device 110 or otherwise presented upon display 112—the system can be configured with a listing of applications that are most likely to be associated with communication sessions or activity subject to monitoring. In some embodiments, solely the indication of the current application 116 can be sufficient to cause trigger detection system 134 to command screenshot capture system 132 to begin obtaining screenshots, e.g. in a blacklist/whitelist model governing the various applications installed upon computing device 110. Other potential trigger signals evaluated by trigger detection system 134 can include an indication that a known communication application has become current application 116, that current application 116 is about to switch to a new application, that the user of computing device 110 is operating a keyboard (either physical or virtual), logging into or activating computing device 110, providing a swipe or other gestural input to computing device 100, providing a scrolling input, providing an input into one or more of the hardware inputs 114, etc. More broadly, the potential trigger signals are indicative of a user interaction with computing device 110 that might be used to achieve communication with others or to view content provided by others, e.g. over the Internet or other electronic communication networks.

Once a potential trigger signal has been detected, it is then processed and classified. This classification system can be configured with various granularity levels, ranging from binary (confirm as trigger, Yes/No) to continuous numerical (probability a trigger is present, 0-100%), or various other classification systems as desired. In some embodiments, trigger detection system 134 obtains one or more inputs from one or more of current application 116, hardware inputs 114, and key logger 136 in order to classify a potential trigger signal. For example, trigger detection system 134 might first detect that the user has just opened a new application on computing device 110 such that current application 116 has just changed to an email application. This potential trigger signal might indicate a medium probability that a screenshot will need to be triggered—the user might begin composing an email (which should be captured in a screenshot) or might simply read a received email (which does not necessarily need to be captured in a screenshot). On its own, the opening of an email application as current application 116 may not trigger a screenshot, and will instead be stored in memory as a first potential trigger signal (stored potential trigger signals can be associated with an expiration condition, which could be time based [30 seconds] or event based [user exits email application/current application 116 changes]) that needs analysis against additional potential trigger signals in order to be validated or discarded. For example, if user input is also detected by trigger detection system 134, such as via key logger 136 or via hardware inputs 114, while the first potential trigger signal remains active, then the combination of this second potential trigger signal with the first potential trigger signal can be sufficient for trigger detection system 134 to generate and transmit a screenshot trigger to screenshot capture system 132.

These screenshot triggers can include additional parameters specifying the number of screenshots to be taken, the periodicity with which to take screenshots, the duration for which to take screenshots, etc., or in other words, the screenshot triggers can be 'smart' such that they are sufficiently self-contained to both initiate the capture of screenshot data and specify when or how the capture of screenshot data should be terminated. In some embodiments, screenshot triggers may not include any of these additional parameters, and one screenshot trigger may be needed for every screenshot to be obtained by screenshot capture system 132. Alternatively, one screenshot trigger may be used to initiate screenshot capture and a second screenshot trigger may be used to terminate screenshot capture. Regardless of the specific configuration of the screenshot triggers, the inter-operation between screenshot capture system 132 and trigger detection system 134 permits a desired number of screenshots to be captured over a desired interval.

Other examples of potential trigger signals or potential trigger events detected by trigger detection system 134 can include one or more keystrokes or text inputs followed by a UI input of a 'send' or 'transmit' button, where this button may be associated with an operating system of computing device 110 or associated with the user interface of the current application 116. A user actuation of a 'send' or 'transmit' button indicates that the user-generated communication content has been queued for transmission to one or more recipients—this is a good time to capture at least one screenshot because screenshot capture system 132 will most likely capture the entirety of the user-generated communication content. Additionally, the captured screenshot(s) can be analyzed to detect the user-generated communication content and compare it with the keystrokes obtained by key logger 136 (in embodiments where key logger 136 is utilized). Such a correlation can be used to create a 'bookmark' point in the current conversation, allowing additional screenshot image files, logged keystrokes, and ultimately, extracted communication content, to be temporally sequenced with respect to the bookmark points in order to thereby recreate the correct and original communication flow between the user being monitored and the other individuals participating in the communication(s) with the user being monitored. The collection or identification of such bookmark points becomes of particular importance when the screenshots obtained by screenshot capture system 132 are not in a chronological or other logical order, e.g. a user switches back and forth different communication sessions in different communication applications, a user scrolls back into the conversation history of a given conversation session such that newly received messages are not displayed and will need to be captured at a later time, etc. In each of these cases, the captured screenshots may not display an appreciable relationship or categorization when viewed simply in the order in which they were obtained by screenshot capture system 132, or in other words, a conversation flow cannot necessarily be inferred from the capture order of the screenshots alone. Additionally, most communication sessions have no clear start or end, and are interspersed with numerous pauses, which may span minutes, hours, days, weeks, or even more before eventually resuming. Accordingly, a plurality of bookmark points can help correlate a newly captured screenshot with an already logged communication system that was detected and saved by content monitoring system several months ago. In some embodiments, when 'smart' triggers are employed, one or more of the smart trigger events might also comprise a bookmark point, as both smart triggers and bookmark points generally relate to and attempt to convey some sort of distinguishing or important occurrence within the content captured by the screenshot. However, it is also possible that one or more bookmark points can be calculated separate from trigger events, whether 'smart' or otherwise.

Once screenshot capture system 132 is triggered by trigger detection system 134, one or more screenshot image files are generated, each corresponding to the content presented on display 112 at the particular moment the given screenshot was captured. Once captured, content processing is applied to the screenshot image files in order to extract and reconstruct the communication session or other information contained within the content. In the particular example of FIG. 1, this content processing is performed by content processing system 170, although as mentioned previously, one or more of the sub-components 172-176 could instead be associated with computing device 110 and/or monitoring application 130.

Screenshot and Content Processing

As mentioned previously, FIGS. 2-8 depict an operative example of the screenshot and content processing workflow that can be performed by content monitoring system 100; FIGS. 2-5 depict the processing pipeline beginning with screenshot capture at screenshot capture system 132 (see FIG. 2) and ending with content extraction at content extraction system 176 (see FIG. 5); and FIGS. 6-8 depict various exemplary manners in which content sequencing can be performed by content sequencing system 150.

As illustrated, content processing system 170 comprises content analysis system 172, content classification system 174, and content extraction system 176. Content sequencing system 150 is coupled to the output of content extraction system 176 but is shown as a separate component from content processing system 170. In some embodiments, content sequencing system 150 can be combined with content processing system 170.

Content analysis system 172 is communicatively coupled to screenshot capture system 132 and receives as input the raw screenshot image files (or more generally, the screenshot image files output by screenshot capture system 132, which may apply some degree of pre-processing). Upon receiving a given screenshot image file, such as the screenshot 200 of FIG. 2, content analysis system 172 can subsequently generate metadata for the given screenshot, wherein this metadata will be used in later steps in the presently disclosed processing pipeline. For example, this metadata can include information indicative of the current application 116 that was running when screenshot 200 was captured. In other words, at least a portion of the content contained within screenshot 200 is associated with current application 116. In this case, the current application 116 associated with screenshot 200 was a text messaging application, and screenshot 200 contains various types of visual and textual content associated with this text messaging application.

In some embodiments, the current application information metadata can be appended to screenshot 200 via monitoring application 130 as a pre-processing step prior to transmission of the screenshot to content analysis system 172. In some embodiments, the current application information metadata can be generated by content analysis system 172, using a machine vision or image recognition system to compare the format or visual style of at least a portion of screenshot 200 with various known or expected formats and visual styles of applications that are installed on computing device 110.

Figure 2:
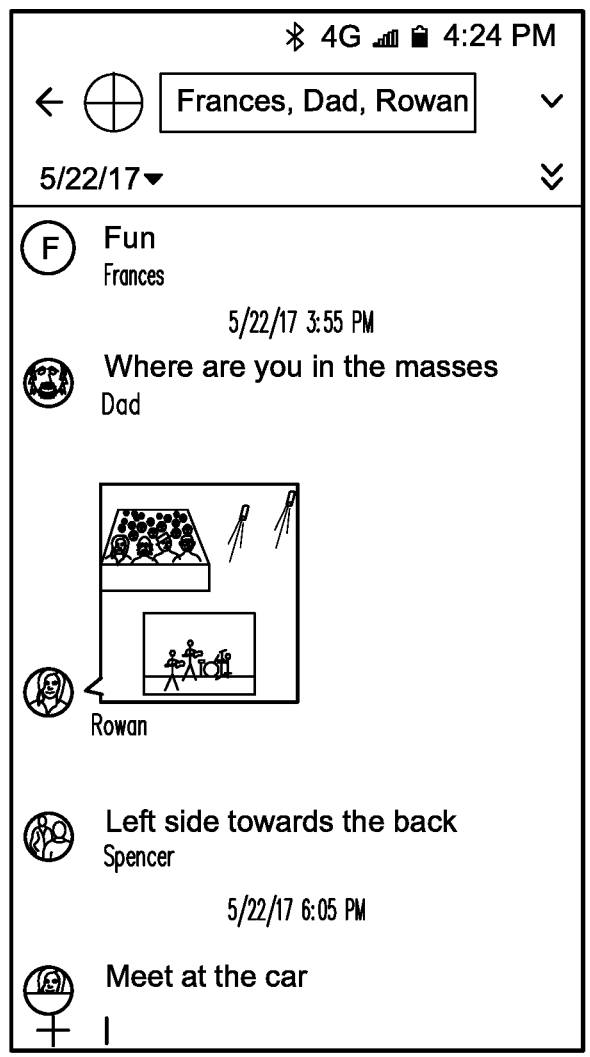
FIG. 2 depicts an exemplary screenshot image according to an aspect of the present disclosure.

The application information metadata can additionally include an application version corresponding to the version of the text messaging application of FIG. 2 (i.e. the current application 116 at the time of screenshot capture) that was detected by monitoring application 130 when screenshot 200 was captured by screenshot capture system 132. This version information can be important when different versions of the same application have different formats or visual styles. Content analysis system 172 can maintain a list of applications currently installed on computing device 110 (where the list is obtained from the operating system of computing device 110 by monitoring application 130), and maintain current version and/or version history information for each application on the list. Upon receiving a screenshot, content analysis system 172 can perform a lookup within this list in order to determine the corresponding application version and any formatting or visual style characteristics associated with that particular application version. In some embodiments, a machine learning algorithm could be employed to detect the application type and the application version corresponding to a given screenshot, wherein the machine learning algorithm can be trained on a training data set comprising previously captured screenshots that have already been processed and analyzed to detect, analyze, classify, and extract their constituent content. Finally, note that in some embodiments, this step of application identification can be omitted, although the general process of application identification as described above does generally improve the performance and quality of results obtained from content processing system 170 in the remaining steps that are to be described below.

Figure 3:
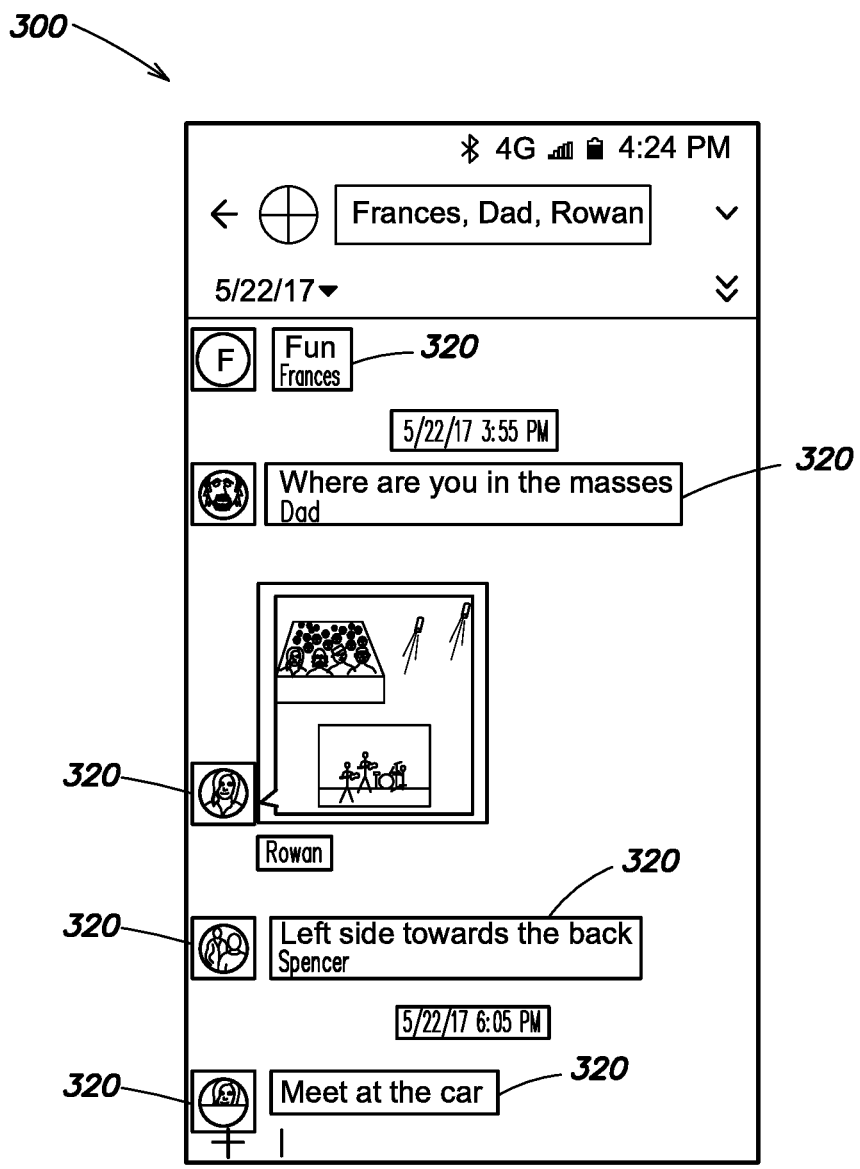
FIG. 3 depicts an exemplary content boxed screenshot image according to an aspect of the present disclosure.

Whether or not application identification is performed, content analysis system 172 will perform content boxing, which is a process to indicate with boxes, boundaries, or other coordinates the particular area(s) within the given screenshot which contain text, images, or other communication content that will need additional processing in the content processing system 170. FIG. 3 depicts a screenshot 300 with a plurality of boxing overlays 320 on the identified content within the screenshot, which here is identical to screenshot 200. Advantageously, boxing permits the textual or visual content with screenshot 300 to be differentiated from other elements that exist in the screenshot but are not of particular interest, e.g. the notification bar, drop down menu symbols, navigation buttons, an on-screen keyboard (not shown), etc. In some embodiments, a boxing output can be coordinate based—two opposing corners are all that is needed to define a rectangular box within the screenshot (e.g. coordinates of top right and bottom left corners, or coordinates of top left and bottom right corners).

Content analysis system 172 can utilize a computer vision system to generate the necessary boxed screenshot data 320, and once sufficient boxed screenshot data has been generated, it can be compiled into one or more training data sets to train a machine learning system to automatically perform boxing based on one or more patterns identified within the training data sets by the machine learning system.

As mentioned previously, if the metadata associated with a given screenshot includes application identifying information, then the layout or format of the given screenshot currently being processed is known, based on the known visual characteristics of specific versions of specific applications. From the known layout or format of the screenshot that is being processed, it is therefore known where the communication content of interest will be located, or at a minimum, identifying characteristics of the communication content of interest will be known. For example, certain communication applications may render textual information within a blob (i.e. a chat bubble or floating cloud), other communication applications may render textual information as plain text on a plain background (i.e. a new line for each message but no other formatting), while even still further communication applications may render textual information as blobs which reside on a textured or content-filled background (e.g. chat bubbles over a background landscape image selected by the user).

For example, screenshot 300 corresponds to a certain text messaging application which may be known to always display text message content over a plain background, although each text message is also displayed immediately adjacent to a circular blob containing an image or an alphanumeric symbol representative of each participant in the text message conversation. In this manner, knowledge that screenshot 300 is captured from the text messaging application can permit content analysis system 172 to identify text messages or textual communication content by locating a circular image on the left-hand side of screenshot 300 and then capturing text to the right of the circular image blob.

In order to generate boxing parameters for text that is displayed on a plain background, various image thresholding algorithms can be applied by content analysis system 172. For example, the image thresholding algorithm can be Otsu's algorithm, although it is appreciated that other image thresholding algorithms can be utilized without departing from the scope of the present disclosure. The image thresholding algorithm applied by content analysis system 172 generates a black and white version of the given screenshot image, where textual content is rendered as black and backgrounds are rendered as white. Next, a series of morphological image operations (typically 'closing') are applied to effectively connect nearby letters and words into a single black object on a white background. A contour detection algorithm is then applied, and returns the edge pixels or edge pixel coordinates of the generated black object. This process is repeated to generate a list of pixels corresponding to one or more black objects (i.e. groups of letters and words) within the given screenshot image file. From this list of pixels, the content analysis system 172 calculates a tight bounding box that surrounds the object, and therefore, surrounds the textual content that is to be extracted.

The above description assumed that text was displayed on a plain background. In instances where textual content is displayed within a blob, an additional pre-processing step may be required before image thresholding can be performed. Based on the background color(s) of the blobs used by the current application 116 that was running when the given screenshot was captured, the blobs can be detected using various computer vision or color recognition techniques. If color information of the blobs is not readily available, then this information may also be calculated from a color histogram of the screenshot image file, and the blobs then detected in the same manner. Once the blobs have been detected, the process of image thresholding as described above can be applied, as text within a blob is simply plain text on a plain colored background.

In some embodiments, the boxing output of content analysis system 172 is a list of [topLeft, bottomRight] pixels for each piece of content (textual or otherwise) that was detected. These [topLeft, bottomRight] boxing coordinates signify rectangular areas where content exists, and can be appended to the metadata of the screenshot image file such that any subsequent processing can immediately locate content within the screenshot by simply parsing the screenshot metadata, meaning that the boxing data 320 of FIG. 300 is not necessarily a literal representation of the output of content analysis system 172, but is an illustrative visual example of the boxing that would be calculated from the [topLeft, bottomRight] boxing coordinates. The screenshot metadata can be extended to include information regarding the specific manner in which a particular boxing coordinate was obtained, e.g. if the box is from a blob or not, and if so, what the blob color is, etc.

The screenshot image files, with their metadata appropriately updated by content analysis system 172, next pass on to content classification system 174, which reads the metadata of each given screenshot in order to find each portion of boxed content and then identify the type of information within each portion of boxed content. The identified type of content can then be saved into the screenshot metadata as well. FIG. 4 depicts a screenshot 400 after content classification has been performed, and as illustrated, screenshot 400 is identical to screenshot 300 of FIG. 3 after content classification has been performed.

Content classification system 174 can perform content classification based on known formatting or visual stylistic information corresponding to the application 116 that was running on computing device 110 when screenshot 400 was captured. For example, as mentioned previously, screenshot 400 is known to correspond to a certain text messaging application which always displays text message content over a plain white background, and it is further known that each text message is also displayed immediately adjacent to a circular blob containing an image or an alphanumeric symbol representative of each participant in the text message conversation. In this manner, knowledge that screenshot 40 is captured from the text messaging application can permit content classification system 174 to classify user images by locating circular blobs on the left-hand side of screenshot 300, to classify user transmitted images by locating square blobs immediately to the right of one of the user images, and to classify textual content as all remaining unclassified content boxes immediately to the right of one of the user images. In some embodiments, textual content can be performed by applying an OCR (Optical Character Recognition) algorithm to the content boxes, and classifying a given content box as 'text' if the OCR algorithm returns a text-based output.

In some embodiments, content boxes containing text can be identified on the basis of color—if the entirety of the content box is black and white, or is two-tone (one text tone and one background tone), then it is likely a text content box and can be classified as such in the screenshot metadata, or could then be passed to an OCR algorithm as a confirmation step before the content classifier is written into metadata. Similarly, if a content box contains a variety of colors, or contains a suitably high number of gradients/transitions from one color to another, then it is likely an image content box and can be classified as such in the screenshot metadata. In some embodiments, content analysis system 172 and content classification system 174 can be combined into a single component within the architecture of content monitoring system 100.

Content classification system 174 iterates through each content box identified within the listing of coordinate pairs that is saved in the metadata of screenshot 400 and updates each metadata portion with a corresponding classifier tag, as depicted in FIG. 4 ('TEXT' and 'IMAGE' identifiers shown, although additional and/or different classifier tags could be used).

Next, the boxed and classified screenshot 400 is passed to content extraction system 176, which performs one or content extraction routines based on the classifier tag that was previously determined for each content box. FIG. 5 depicts the outcome of content extraction after being applied to screenshot 400, shown here as classified screenshot 500.

Text can be extracted via OCR, which may have been performed in the previous step of content classification, although it is also possible that distinct OCR steps are performed by content classification system 174 and content extraction system 176. For example, the OCR applied by content classification system 174 need only make a binary or rudimentary determination of text? Yes/No, whereas the OCR applied by content extraction system 176 seeks to obtain maximum accuracy. In some embodiments, content extraction system 176 can perform OCR on text content boxes via the Tesseract open source OCR engine, which supports various operation modes using neural networks to extract text from a given text-containing input such as the identified text content boxes of screenshot 500.

Image context can be extracted via one or more machine vision systems, which can include facial recognition systems to recognize faces and compare them with a database of faces known to or otherwise associated with the user (e.g. a facial database compiled from the user's social media account(s), from personal photos taken by the user, etc.). If a match is found, then the identities of one or more individuals displayed within the image content box can be extracted. If facial recognition fails to find a match, then broader object recognition algorithms can be applied to the image content in order to attempt to extract some sort of useful information.

The extracted content calculated by content extraction system 176 can also be written to the same screenshot metadata that was discussed above. In some embodiments, the extracted content can be written to one or more stand-alone files containing just the extracted content, the extracted content plus original boxed screenshot data, etc., as is desired.

Notably, the application of content processing system 170 can reduce a several megabyte (MB) screenshot image file down to only several kilobytes (KB) of extracted textual content and other metadata/identifiers—a reduction in size of approximately three orders of magnitude, which can reduce the storage and data transmission requirements of the content monitoring system 100 assuming that, once generated and made available, the extracted textual content is utilized for any further transmission or storage processes rather than the original screenshot image data.

The extracted content then proceeds to sequencing at content sequencing system 150, which can perform corrections and adjustments to the extracted textual/image content such that the content adheres to the language and context of the conversation from which it was derived and is furthermore arranged in a logically or temporally correct sequence of the conversation (with respect to an absolute temporal frame in which the conversation actually occurred, not the temporal frame or order in which the screenshots were captured). In some embodiments, content sequencing system 150 operates on the basis of one or more bookmark points determined from the output of key logger 136.

FIG. 6 shows one such exemplary bookmarking operation 610, as applied to the content extracted from screenshot 500. The key logger 136 is equipped with a reference clock, which is used to timestamp each input received to the key logger. For example, as shown in exemplary bookmarking operation 610, a first logged input 612*a* is "Left side towards the back" and is associated with a corresponding timestamp 612*b* of '4:32 PM 5.22.2017', and a second logged input 614*a* is <ENTER> and is associated with a corresponding timestamp 614*b* of '4:33 PM 5.22.2017'.

This process is repeated by key logger 136, such that the logged and timestamped inputs are transmitted to content sequencing system 150 or otherwise stored in a database which content sequencing system 150 is able to access. Upon receiving extracted text content 635 comprising "Left side towards the back", content sequencing system 150 searches for a matching text input that was registered and timestamped by key logger 136. When a match is successfully located, content sequencing system 150 generates an anchor bookmark 645 which associates the extracted text content 635 with the timestamp 614*b* at which it was transmitted. In this manner, extracted text content 635 can be temporally placed in a reconstructed conversation flow generated by content sequencing system 150.

This bookmarking process can be repeated for each timestamped input obtained by the key logger 136. Recalling that key logger 136 can only log user input into computing device 110, content sequencing system 150 is therefore operable to generate anchor bookmarks for each piece of user-entered textual content, which collectively establish a framework around which communication content received from other individuals can be filled in based on their visually determined proximity to one or more of the anchor bookmarks. In this manner, content sequence system 150 can create an accurate time sequencing of what has been captured on the screen (via the screenshots) and typed by the user, and fitting in between the content that was received from remote conversation parties.

In some embodiments, content extraction system 150 may operate without the use of key logger 136. In this manner, extracted content can be arranged into a relatively correct sequence (that is, A before B before C before D . . . etc.) although this sequence will not include information indicative of the specific time gaps between each piece of extracted content. Content extraction system 150 can, in this embodiment, operate by locating overlapping pieces of extracted content across a plurality of different screenshots—each individual screenshot has a self-contained ordering of extracted content pieces, and by finding overlapping extracted content pieces in two different screenshots, the two respective self-contained orderings of extracted content pieces can be stitched together by using the overlap as a reference point. In this approach, content extraction system 150 can maintain a comprehensive database of extracted content such that even if very old content is newly received, it can be appropriately sequenced into a correct portion of a conversation flow.

FIG. 7 depicts an exemplary bookmarking operation 710, as applied to the content extracted from screenshot 500. Bookmarking operation 710 also does not necessarily make use of key logger 136, and instead operates by extracting timestamps from the screenshot data itself. For example, content sequencing system 150 receives a textual content box 735*a* containing "Where are you in the masses?", and determines that textual content box 735*a* is disposed immediately beneath a timestamp content box 735*b* containing the text "5/22/2017 3:55 PM". Based on their immediate proximal arrangement, content sequencing system 150 determines an anchor bookmark 745 comprising this textual content box 735*a* and the timestamp content box 735*b*, solely on the basis of their visual formatting and arrangement with respect to one another within the screenshot image.

FIG. 8 depicts an exemplary bookmarking operation 810, which generates an implicit anchor bookmark 845 using the two anchor bookmarks 645, 745 of FIGS. 6 and 7 respectively. Content sequencing system 150 visually ascertains that an extracted image content 840 is located between anchor bookmark 745 and anchor bookmark 645. On this basis, the implicit anchor bookmark 845 is generated to provide an upper and lower bound on the temporal placement of the extracted image content 840: it must be no earlier than the time indicated by anchor bookmark 745 (3:55 PM 5.22.2017) and it must be no later than the time indicated by anchor bookmark 645 (4:33 PM 5.22.2017). In some embodiments, every time a new anchor bookmark is calculated by content sequencing system 150, all associated implicit anchor bookmarks can be updated in view of the new anchor bookmark, thereby providing that the temporal sequencing provided by content sequencing system 150 either stays the same or improves over time as additional information may be received.

In some embodiments, one or more of the aforementioned processing steps can be applied repeatedly in order to provide more efficient or more accurate content processing and extraction. Additionally, the algorithms and processing applied in each portion of the processing pipeline can be tuned to balance between speed and accuracy, as there is almost always some inherent tradeoff between these two. In some embodiments, the boxing step of content analysis system 172 may be repeated and may yield another box of text content that had not been preciously discovered in a more coarse content and boxing search. On the basis of this newly discovered text box, a new anchor bookmark is formed and may be utilized to update the previously determined content sequence from content sequencing system 150.

In some embodiments, the screenshots captured by screenshot capture system 132 can be downscaled or otherwise reduced in size, which causes a corresponding reduction in the file size of the screenshot image, thereby reducing the storage and communication network bandwidth required by content monitoring system 100. In some embodiments, the screenshot images can be converted into a greyscale image or otherwise compressed by one or more compression algorithms before being transmitted. In performing any of these techniques to reduce file size, the technique can be tuned such that the text within the modified screenshot is still recognizable by the desired OCR algorithm(s) applied by content processing system 170.

In some embodiments, and as mentioned previously, a portion of the workflow can be skipped. For example, in an environment where broadband or a sufficient data transfer bandwidth is not available, boxing and content extraction can be applied only to text, such that image data is ignored. In doing so, bandwidth consumption can be reduced by three orders or magnitude, as only the kilobytes of extracted textual data is transmitted over the network instead of the megabytes of screenshot image data.

Deferred processing policies can be provided on one or more of monitoring application 130 and computing device 110 in order to optimize one or more of power utilization and bandwidth consumption. For example, screenshot capture system 132 may capture a plurality of screenshot image files, but these screenshot image files will not be transferred or uploaded to content analysis system 172 or content processing system 170 until certain processing policies are met. These policies can include policies to only transmit the screenshot image files when computing device 110 is connected to a charger or has a battery level above a pre-defined threshold, and policies to only transmit large amounts of data when device 110 is connected to WiFi or broadband mobile data.

In some embodiments, monitoring application 130 may perform a similarity check against screenshot image files that were captured very close in time to one another. If any redundancies are found, that screenshot can be deleted and not transmitted to content analysis system 172 or content processing system 170.

As mentioned previously, content classification and extraction can determine the identity of one or more remote participants in the conversation with the user of computing device 110. Once a remote participant is identified, a policy may be in place that indicates an urgency or importance of monitoring for different individuals. For example, if multiple remote participants are detected, then a lower priority processing (such as delayed or limited screenshot image uploads, as described above) can be applied, based on the lower likelihood of threatening messages being present in a group conversation. Conversely, if a highly threatening remote participant is detected, then that conversation can be assigned a processing priority, particularly in scenarios of limited resources available to computing device 110 (e.g. limited bandwidth, limited storage, limited battery). Additionally, a highly threatening or forbidden remote conversation participant can trigger a warning or other notification to be generated and transmitted to one or more individuals with supervisory authority over the user of the mobile computing device 110 that is being monitored by the content monitoring system 100 of the present disclosure.

In some embodiments, multiple participants of the same conversation(s) might all be registered with content monitoring system 100, in which case system 100 can intercept the keystrokes of the multiple conversation parties (e.g. using key logger 136) and correlate them with their shared conversations in system 100 or with any other extracted text content that is present in system 100. In this manner, particularly when an appreciable number of users are all registered with content monitoring system 100, the frequency of screenshot transmission and analysis (which is relatively expensive as compared to keystroke log transmission, analysis, and correlation) can be reduced, as an increased percentage of keystrokes reported by the various conversation parties/users of system 100 are instead used to reconstruct conversation flows.

Figure 9:
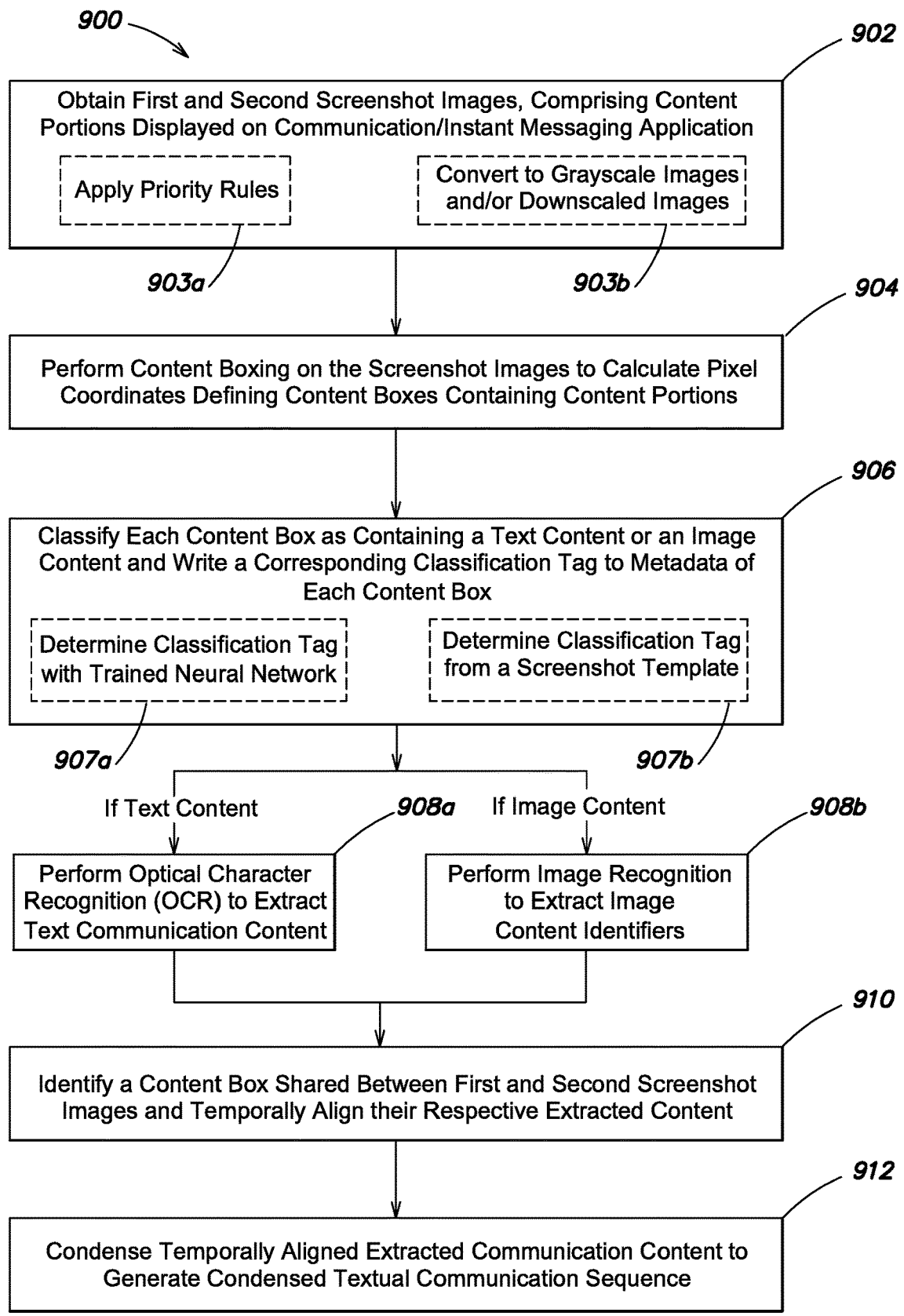
FIG. 9 depicts a flowchart of an exemplary method according to an aspect of the present disclosure.

FIG. 9 depicts an exemplary flowchart 900 according to an exemplary method according to aspects of the present disclosure. For example, in some embodiments the flowchart 900 might correspond to one or more of the examples and descriptions previously given with respect to one or more of FIGS. 1-8.

In a first step 902, a monitoring application provided on a user computing device obtains at least first and second screenshot images of a displayed content on the user computing device. For example, at least a portion of the displayed content might correspond to a plurality of content portions (such as messages, textual communications, images, videos, etc.) displayed on a communication or instant messaging application running on the user computing device. The communication or instant messaging application can currently be running in the foreground of the user computing device, may have just exited the foreground, or may have just entered the foreground. The first and second screenshots can be captured in a variety of ways, including via a screenshot capture system provided as a component of, or a separate system from, the monitoring application. Additionally, the capture of the screenshot images can be triggered according to one or more of the trigger and/or detection techniques previously described herein.

In some embodiments, in a step 903*a*, one or more priority rules can be applied. These priority rules can dictate certain conversations, applications, individuals, text or image content(s) that the monitoring application should prioritize obtaining screenshots of.

In some embodiments, in a step 903*b*, one or more captured screenshot images can be converted from color images to grayscale images (reducing their file size) and/or one or more captured screenshot images can be downscaled (also reducing their file size and occasionally, their resolution). Both steps 903*a* and 903*b* can be performed, only one of steps 903*a* and 903*b* can be performed, or neither of steps 903*a* and 903*b* could be performed, depending on various characteristics and performance parameters desired.

In a step 904, content boxing is performed on at least the captured first and second screenshot images. Content boxing can be performed in accordance with at least the techniques previously described herein. For example, pixel coordinates defining opposing corners of a content box containing a given content portion within the screenshot image can be calculated and saved. In some embodiments, the pixel coordinates (or other content boxing information) can be saved in a metadata information associated with the screenshot. Pixel coordinates and content boxing information can also be saved as a separate metadata or in a separate file structure.

In a step 906, each content box is classified as containing a text (e.g. text message or other textual message/communication) content or an image content, although other classifications are also possible. The determined classification tag is generated and is written to the metadata of each content box, thereby supplementing the pixel coordinates or other boxing information obtained in step 904.

In some embodiments, in a step 907*a*, one or more classification tags can be determined by a trained neural network or other machine learning platform.

In some embodiments, in a step 907*b*, one or more classification tags can be determined from a screenshot template indicating expected locations, content types, etc. expected for the given screenshot based on a certain user application that is determined to be associated with the given screenshot. In some embodiments, one or more outputs from step 907*b* can be utilized to generate one or more training data sets (not shown) for training the neural network or machine learning platform of step 907*a*. Both steps 907*a* and 907*b* can be performed, only one of steps 907*a* and 907*b* can be performed, or neither of steps 907*a* and 907*b* could be performed, depending on various characteristics and performance parameters that are desired or configured.

In a step 908*a*, for content boxes classified as containing text content, OCR is performed on the content box to extract the textual communications therein. Various OCR algorithms can be used, including but not limited to, the Tesseract engine.

In a step 908*b*, for content boxes classified as containing image content, image recognition is performed to extract image content identifiers, such as an object type, an image type, an individual within the image, etc.

Next, in a step 910, a content box that is shared (i.e. present) in both the first screenshot image and the second screenshot image is identified. This shared content box is used as a reference point with which to temporally align the respective extracted content from the first screenshot image and the extracted content from the second screenshot image.

Once aligned, in a step 912 the temporally aligned extracted communication content is condensed to thereby generate a condensed reconstructed textual communication sequence corresponding to at least the communication(s) carried out via the user application portrayed by the first and second screenshot images.

Figure 10A:
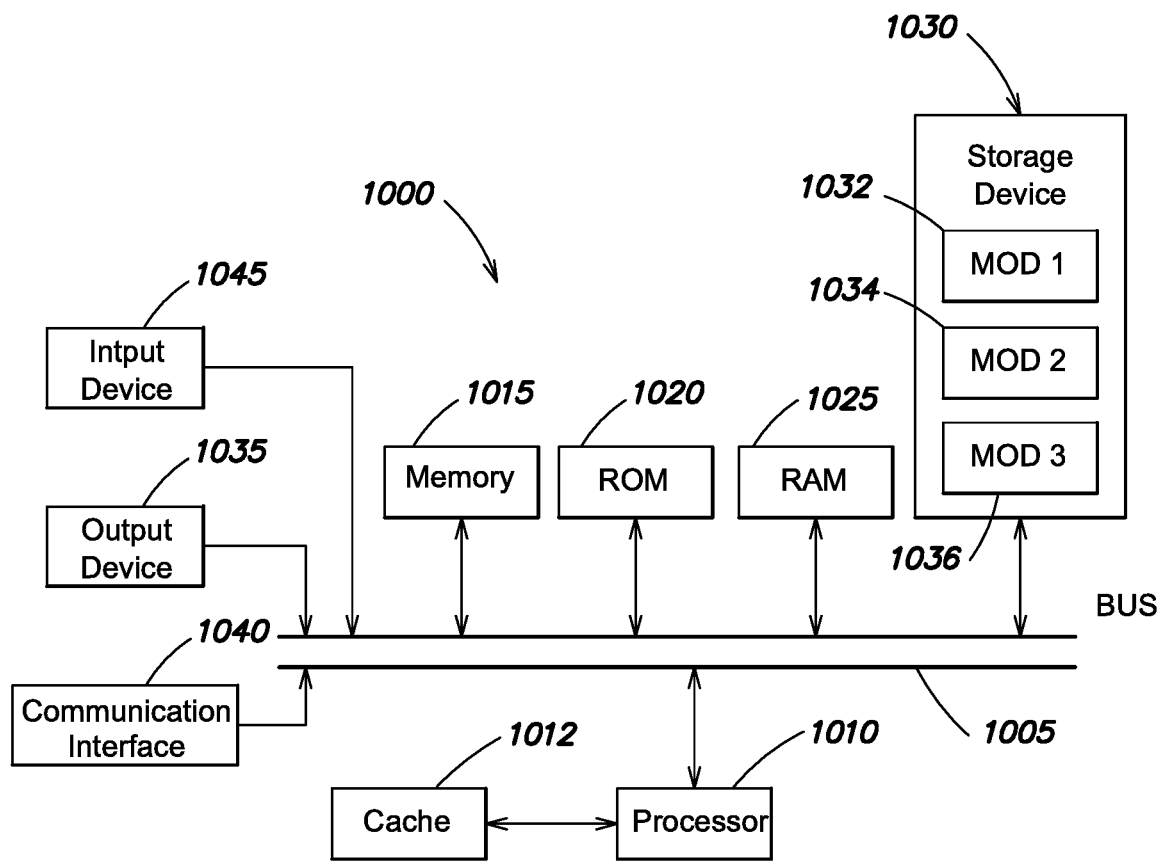
FIG. 10A depicts an exemplary conventional system bus computing system architecture that can be used in one or more systems and methods according to aspects of the present disclosure.
Figure 10B:
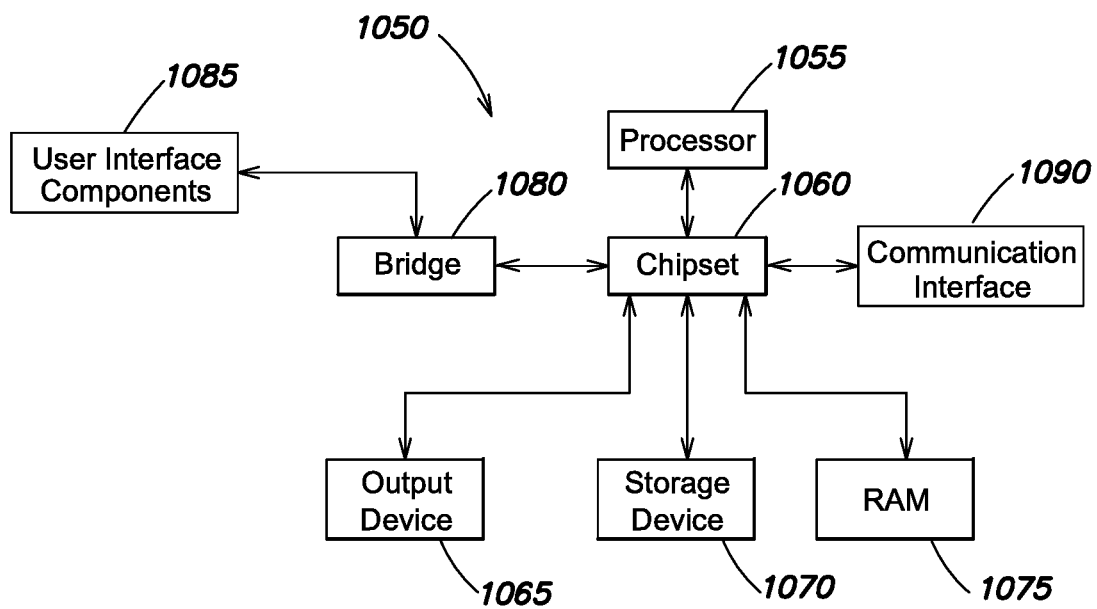
FIG. 10B depicts exemplary computer system having a chipset architecture that can be used in one or more systems and methods according to aspects of the present disclosure.

FIG. 10A and FIG. 10B illustrate example system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates an example computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output device 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that example systems 1000 and 1050 can have more than one processor 1010 or be part of a group or cluster of computing devices networked together to provide greater processing capability. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example. The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method for content monitoring, the method comprising:

obtaining, from a monitoring application provided on a first computing device, first and second screenshot images each comprising a plurality of content portions displayed by a communication application on the first computing device;

performing content boxing on the first and second screenshot images to calculate a plurality of content boxes, each content box containing a given one of the plurality of content portions;

classifying each content box as containing a textual communication content or an image communication content;

for each content box classified as containing the textual communication content, performing Optical Character Recognition (OCR) to extract one or more textual communications from the textual communication content and for each content box classified as containing the image communication content, performing image recognition to extract one or more object identifiers;

identifying at least one shared content box present in both the first and second screenshot images and, based on the at least one shared content box, temporally aligning the textual communications extracted from the first screenshot image with the textual communications extracted from the second screenshot image; and condensing the temporally aligned textual communications to generate a condensed textual communication sequence.

2. The method of claim 1, the classifying of each content box as containing the textual communication content or the image communication content being based on one or more of:

a color composition of the content box; and a relative position of the content box within the first or second screenshot image and an expected screenshot layout associated with the communication application.

3. The method of claim 1, further comprising:

temporally aligning content boxes classified as containing the image communication content with the condensed textual communication sequence; and inserting the temporally aligned content boxes to generate a composite reconstructed communication sequence.

4. The method of claim 1, wherein the condensing the temporally aligned textual communications comprises removing redundant temporally aligned textual communications.

5. The method of claim 1, further comprising capturing a user input to the communication application on the first computing device by using a key logger, the key logger configured to associate each captured user input with a timestamp at which the captured user input was received.

6. The method of claim 5, further comprising:

searching the captured user inputs obtained by the key logger for one or more of the extracted textual communications; and in response to locating a given extracted textual communication within a captured user input obtained by the key logger, generating a temporal reference point by associating the given extracted textual communication with the timestamp of the matching captured user input.

7. The method of claim 6, further comprising temporally aligning a plurality of extracted textual communications by calculating each extracted textual communication's relative position with respect to one or more generated temporal reference points.

8. The method of claim 1, wherein the obtaining first and second screenshot images comprises:

detecting, from the first computing device, an indication that the communication application is running in the foreground of the first computing device and a user of the first computing device has provided one or more user inputs;

capturing at least the first and second screenshot images, such that the first and second screenshot images are captured at separate times; and based on the one or more inputs provided by the user of the first computing device, capturing at least a third screenshot image different from the first and second screenshot images.

9. The method of claim 8, wherein the one or more user inputs comprise a keyboard input, an account login input, a swipe input, a gesture input, or a scrolling input.

10. The method of claim 5, further comprising:

generating a trigger signal for screenshot image capture in response to determining that the user input to the communication application comprises an actuation of an enter or send user interface element.

11. The method of claim 1, wherein one or more of the first and second screenshot images are obtained in response to:

determining that the communication application has been commanded to run in the foreground of the computing device; or determining that the communication application has been commanded to stop running in the foreground of the computing device.

12. The method of claim 1, wherein the content boxing comprises calculating at least two opposing pixel coordinates within the first or second screenshot image, such that the two opposing pixel coordinates define the content box containing the content portion.

13. The method of claim 12, wherein a first listing of a plurality of opposing pixel coordinates are saved in a metadata of the first screenshot image and a second listing of a plurality of opposing pixel coordinates are saved in a metadata of the second screenshot image.

14. The method of claim 1, wherein the content boxing comprises applying one or more of an image thresholding algorithm, morphological image transforms, and contour detection algorithms in order to thereby calculate the content box to provide a tight bounding of the content portion.

15. The method of claim 14, wherein the image thresholding algorithm is Otsu's algorithm.

16. The method of claim 1, wherein the classifying each content box comprises applying a neural network to generate a classification tag, where the neural network is trained on training data generated from previously analyzed screenshot images and content boxes.

17. The method of claim 1, wherein image recognition comprises a facial recognition algorithm or a machine learning algorithm trained to identify the communication application associated with one or more of the plurality of content portions.

18. The method of claim 1, wherein the content boxing comprises applying OCR to identify one or more text paragraphs and generating one or more coarse content boxes based on the OCR-identified text paragraphs.

19. The method of claim 2, further comprising at least one of:

downscaling one or more of the first and second screenshot images prior to performing the content boxing; and converting one or more of the first and second screenshot images to grayscale prior to performing the content boxing.

20. The method of claim 1, wherein the image recognition performed on the content boxes classified as containing the image communication content extracts a facial profile or individual identity, and wherein the extracted facial profile or individual identity is used to generate processing priority rules for the screenshot image associated with the content box containing the extracted facial profile or individual identity.

21. A system comprising:

a monitoring application provided on a user computing device, the monitoring application including at least a screenshot capture component; and at least one processor in communication with the monitoring application, wherein the processor is coupled with a non-transitory computer-readable storage medium having stored therein instructions which, when executed by the at least one processor, cause the at least one processor to:

obtain, from the monitoring application, first and second screenshot images each comprising a plurality of content portions displayed by a communication application provided on the user computing device;

perform content boxing on the first and second screenshot images to calculate a plurality of content boxes, each content box containing a given one of the plurality of content portions;

classify each content box as containing a textual communication content or an image communication content;

for each content box classified as containing the textual communication content, perform Optical Character Recognition (OCR) to extract one or more textual communications from the textual communication content and for each content box classified as containing the image communication content, perform image recognition to extract one or more object identifiers;

identify at least one shared content box present in both the first and second screenshot images and, based on the at least one shared content box, temporally align the textual communications extracted from the first screenshot image with the textual communications extracted from the second screenshot image; and condense the temporally aligned textual communications to generate a condensed textual communication sequence.

22. The system of claim 21, wherein the at least one processor classifies each content box as containing the textual communication content or the image communication content based on one or more of:
a color composition of the content box; and
a relative position of the content box within the first or second screenshot image and an expected screenshot layout associated with the communication application provided on the user computing device.

23. The system of claim 21, wherein the instructions further cause the at least one processor to:
temporally align content boxes classified as containing the image communication content with the condensed textual communication sequence; and
insert the temporally aligned content boxes to generate a composite reconstructed communication sequence.

24. The system of claim 21, wherein the instructions cause the at least one processor to condense the temporally aligned textual communications by removing redundant temporally aligned textual communications.

25. The system of claim 21, wherein the instructions further cause the at least one processor to capture a user input to the communication application provided on the user computing device by:
configuring a key logger to associate each captured user input with a timestamp at which the captured user input was received.

26. The system of claim 25, wherein the instructions further cause the at least one processor to:
search the captured user inputs obtained by the key logger for one or more of the extracted textual communications; and
in response to locating a given extracted textual communication within a captured user input obtained by the key logger, generate a temporal reference point by associating the given extracted textual communication with the timestamp of the matching captured user input.

27. The system of claim 26, wherein the instructions further cause the at least one processor to temporally align a plurality of extracted textual communications by calculating each extracted textual communication's relative position with respect to one or more generated temporal reference points.

28. The system of claim 21, wherein the instructions cause the at least one processor to obtain first and second screenshot images by:
detecting, from the user computing device, an indication that the communication application is running in the foreground of the user computing device and a user of the user computing device has provided one or more user inputs;
capturing at least the first and second screenshot images, such that the first and second screenshot images are captured at separate times; and
based on the one or more inputs provided by the user of the user computing device, capturing at least a third screenshot image different from the first and second screenshot images.

29. The system of claim 28, wherein the one or more user inputs comprise a keyboard input, an account login input, a swipe input, a gesture input, or a scrolling input.

30. The system of claim 25, wherein the instructions further cause the at least one processor to:
generate a trigger signal for screenshot image capture in response to determining that the user input to the communication application comprises an actuation of an enter or send user interface element.

31. The system of claim 21, wherein the instructions cause the at least one processor to obtain one or more of the first and second screenshot images in response to:
determining that the communication application has been commanded to run in the foreground of the user computing device; or
determining that the communication application has been commanded to stop running in the foreground of the user computing device.

32. The system of claim 21, wherein the instructions cause the at least one processor to perform content boxing by calculating at least two opposing pixel coordinates within the first or second screenshot image data, such that the two opposing pixel coordinates define the content box containing the content portion.

33. The system of claim 32, wherein the instructions further cause the at least one processor to:
save a first listing of a first plurality of opposing pixel coordinates in a metadata of the first screenshot image; and
save a second listing of a second plurality of opposing pixel coordinates in a metadata of the second screenshot image.

34. The system of claim 21, wherein the instructions cause the at least one processor to perform content boxing by applying one or more of an image thresholding algorithm, morphological image transforms, and contour detection algorithms in order to thereby calculate the content box to provide a tight bounding of the content portion.

35. The system of claim 34, wherein the image thresholding algorithm is Otsu's algorithm.

36. The system of claim 21, wherein the instructions cause the at least one processor to classify each content box by applying a neural network to generate a classification tag, where the neural network is trained on training data generated from previously analyzed screenshot images and content boxes.

37. The system of claim 21, wherein image recognition comprises a facial recognition algorithm or a machine learning algorithm trained to identify the communication application associated with one or more of the plurality of content portions.

38. The system of claim 21, wherein the instructions cause the at least one processor to perform content boxing by:
   applying OCR to identify one or more text paragraphs; and
   generating one or more coarse content boxes based on the OCR-identified text paragraphs.

39. The system of claim 22, wherein the instructions further cause the at least one processor to:
   downscale one or more of the first and second screenshot images prior to performing content boxing; and
   converting one or more of the first and second screenshot images to grayscale prior to performing content boxing.

40. The system of claim 21, wherein the image recognition performed on the content boxes classified as containing the image communication content extracts a facial profile or individual identity, and wherein the extracted facial profile or individual identity is used to generate processing priority rules for the screenshot image associated with the content box containing the extracted facial profile or individual identity.

* * * * *